United States Patent [19]

Silverman et al.

[11] Patent Number: 4,507,993

[45] Date of Patent: Apr. 2, 1985

[54] MACHINE TOOL WITH TWO SPEED TURRET INDEXING

[75] Inventors: Martin L. Silverman, South Euclid; Donald P. Shook, Cleveland Heights, both of Ohio

[73] Assignee: The Warner & Swasey Company, Cleveland, Ohio

[21] Appl. No.: 478,405

[22] Filed: Mar. 24, 1983

[51] Int. Cl.³ .......................... B23B 29/24; B23B 3/16; B23B 7/04; B23Q 17/00
[52] U.S. Cl. ..................................... 82/36 A; 74/826; 29/48.5 R; 409/225
[58] Field of Search .................. 82/2 R, 36 A; 74/826

[56] References Cited

U.S. PATENT DOCUMENTS

| | | | |
|---|---|---|---|
| 3,054,333 | 9/1962 | Braward et al. | 29/26 R |
| 3,999,264 | 12/1976 | Carmen | 74/826 |
| 4,180,894 | 1/1980 | Link | 29/36 |
| 4,413,539 | 11/1983 | Ishizuka et al. | 82/2 R |

Primary Examiner—Francis S. Husar
Assistant Examiner—William E. Terrell
Attorney, Agent, or Firm—Howard G. Massung; Raymond J. Eifler

[57] ABSTRACT

A machine tool (10) utilizing two speed hydraulic indexing with direction control valves (86,88) which are energized to stop. A turret (12) is rotated during indexing by a hydraulic motor (36). An open loop control system is utilized to locate the turret (12) position before clamping. A plurality of cams (40,42,44,46,48,50) which trigger associated proximity switches (41,43,45,47,49,51) are used to provide control information to the electric control circuit (17) for turret indexing. A final position cam (50) which rotates at a multiple of the turret (12) indexing speed is provided for final positioning of the turret (12) at a desired work station. The final position cam (50) is adjustable so that the tool turret (12) will be accurately stopped at a selected work station. The final position cam (50) also provides information which is utilized for switching from a high speed indexing mode to a low speed indexing mode when the selected work station is approached. Cams (40,42) and associated proximity switches (41,43) are also utilized for detecting when the tool turret (12) is in a clamped or unclamped position. The disclosed hydraulic circuit (59) provides for clamping and unclamping of the tool turret (12), high and low speed indexing, accurate positioning of the turret (12) at a selected work station, and safety relief to prevent over pressure in the hydraulic lines.

8 Claims, 20 Drawing Figures

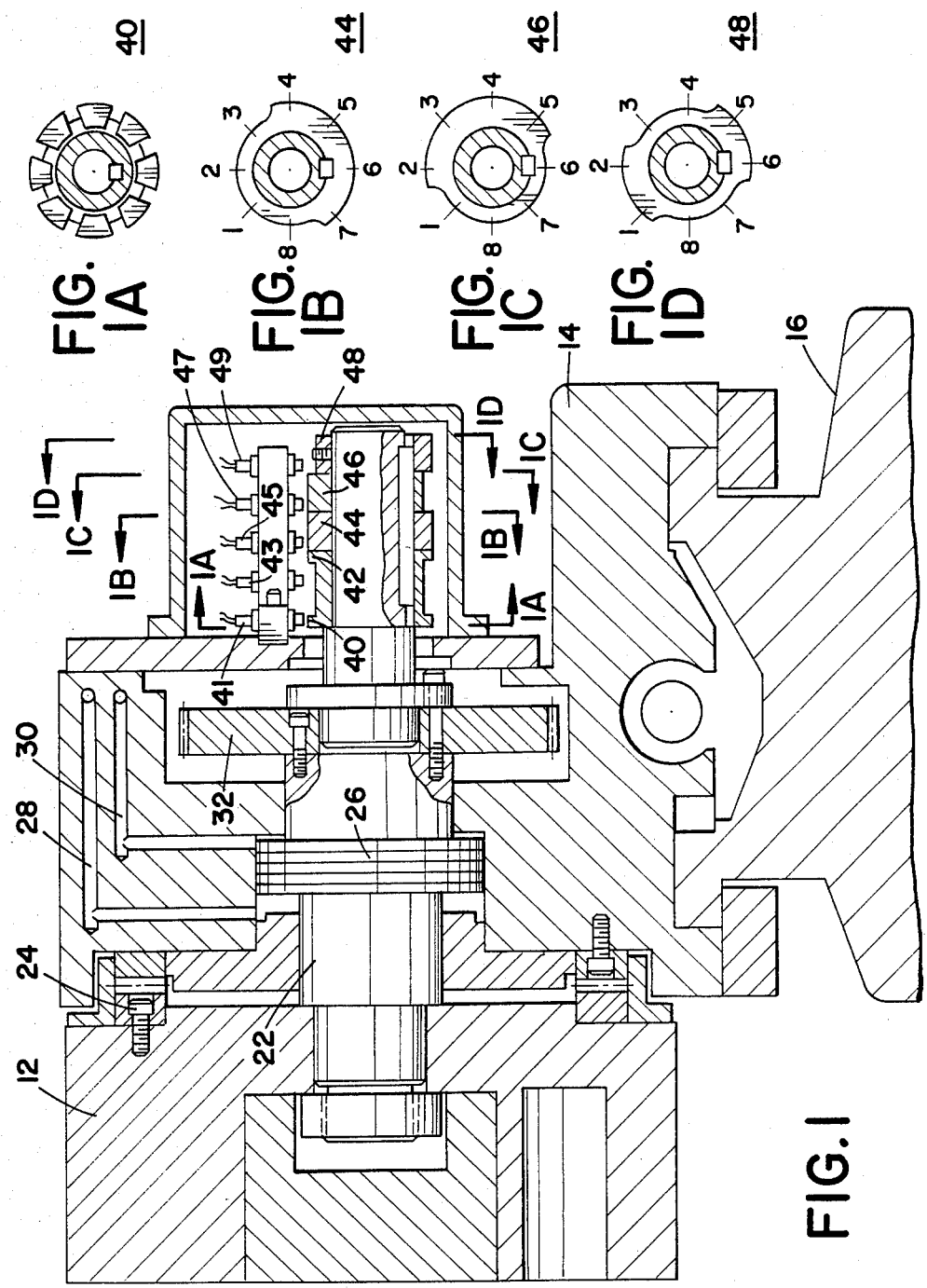

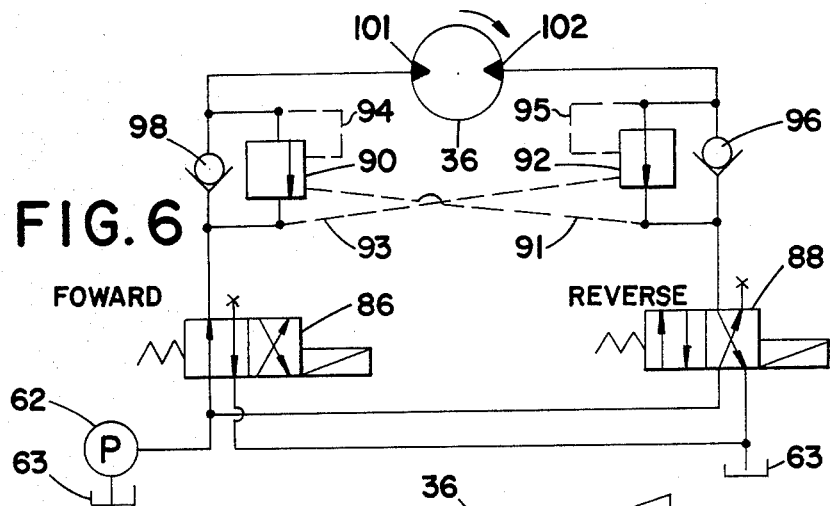
FIG. 5
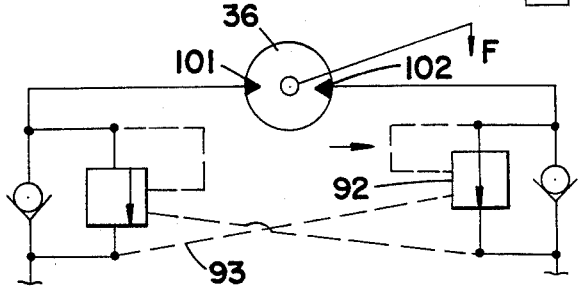
FIG. 6
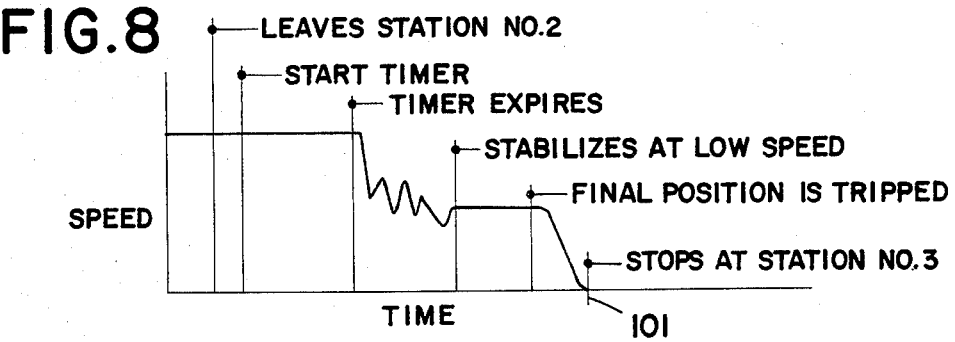
FIG. 7
FIG. 8

MACHINE TOOL WITH TWO SPEED TURRET INDEXING

BACKGROUND OF THE INVENTION

Technical Field

This invention relates to machine tools and more particularly to improved indexing of the tool turret on a numerically controlled turning machine.

Background Art

Mechanical switches and adjustable cam arrangements have been utilized to indicate when a tool turret is properly indexed to a work station. Some current designs of turret indexing controls use a closed loop servo system which constantly feeds back to a controller the exact position of the tool turret so that it can be precisely located and stopped at a desired work station.

DISCLOSURE OF THE INVENTION

The present invention teaches a machine tool which utilizes an open loop control system for locating the tool turret as it is indexed to various work stations. The controller works in conjunction with various sensors and a hydraulic circuit for indexing the tool turret to a desired work station. The turret indexing system uses hydraulic components for clamping and two speed turret rotation. Control valves which are energized to stop rotation are used and they provide accurate stopping repeatability.

The indexible tool turret is supported for two axes movement by a cross slide which is supported from a carriage. The tool turret can be moved in and out, between a clamped position, wherein it is held fixed with respect to the cross slide, and an unclamped position, wherein it can be indexed around its longitudinal axis with respect to the cross slide. A curvic coupling is provided on the cross slide and tool turret for holding the tool turret in accurate alignment when clamped. A turret bar which is connected to the turret for rotation therewith is provided.

A plurality of shaped cams are attached to the turret bar for rotation therewith. A plurality of sensors, one of which is associated with each cam, are provided for sensing cam surfaces. The outputs from the sensors, are utilized for detecting the work station at which the turret is located. For three sensors, each having an on-off position, eight stations can be detected. The cams are shaped so that there is only a one signal transition from the three sensors as the turret is indexed from one work station to or thru an adjacent work station.

An additional pair of sensors are provided for detecting when the turret is in a clamped position or in a full unclamped position. A final position cam which rotates at a multiple of the turret speed is provided. The final position cam is utilized for final fine positioning of the tool turret before clamping at a selected work station.

A two speed, fast and slow, indexing system is provided for indexing the tool turret in either direction. The fast indexing speed is used for rapidly rotating the tool turret toward the desired position. As the desired position is approached the lower rotating speed system is utilized. A final positioning cam then indicates when the tool turret is to be stopped. The turret is stopped in response to a signal from a sensor which is used with the final position cam. The turret is stopped in a position to be clamped at the selected work station.

The curvic coupling utilized has a multiple number of teeth as the number of work stations. The clamped sensing cam is sectionalized so that its sensor can detect if the tool turret is clamped out of position. If the turret is not properly clamped a fault will be indicated to the operator or thru a DNC link to a host computer.

BRIEF DESCRIPTION OF THE DRAWINGS

For a better understanding of the invention, reference may be had to the preferred embodiment exempalarly of the invention shown in the accompanying drawings in which:

FIG. 1 is a section viewed through a tool turret and its supporting cross slide assembly constructed according to the teaching of the present invention;

FIGS. 1A through 1D are views showing four of the cams supported on the turret bar;

FIG. 5 is a chart showing the output of the sensors utilized in conjunction with the cams shown in FIGS. 1B through 1D when the turret is located at any one of its eight work stations.

FIG. 6 is a schematic of a portion of the circuit shown in FIG. 4 showing forward indexing;

FIG. 7 is a schematic of a portion of the circuit shown in FIG. 4 illustrating over speed control;

FIG. 8 is a graph showing turret indexing speed vs time;

BEST MODE FOR CARRYING OUT THE INVENTION

Figure 9:
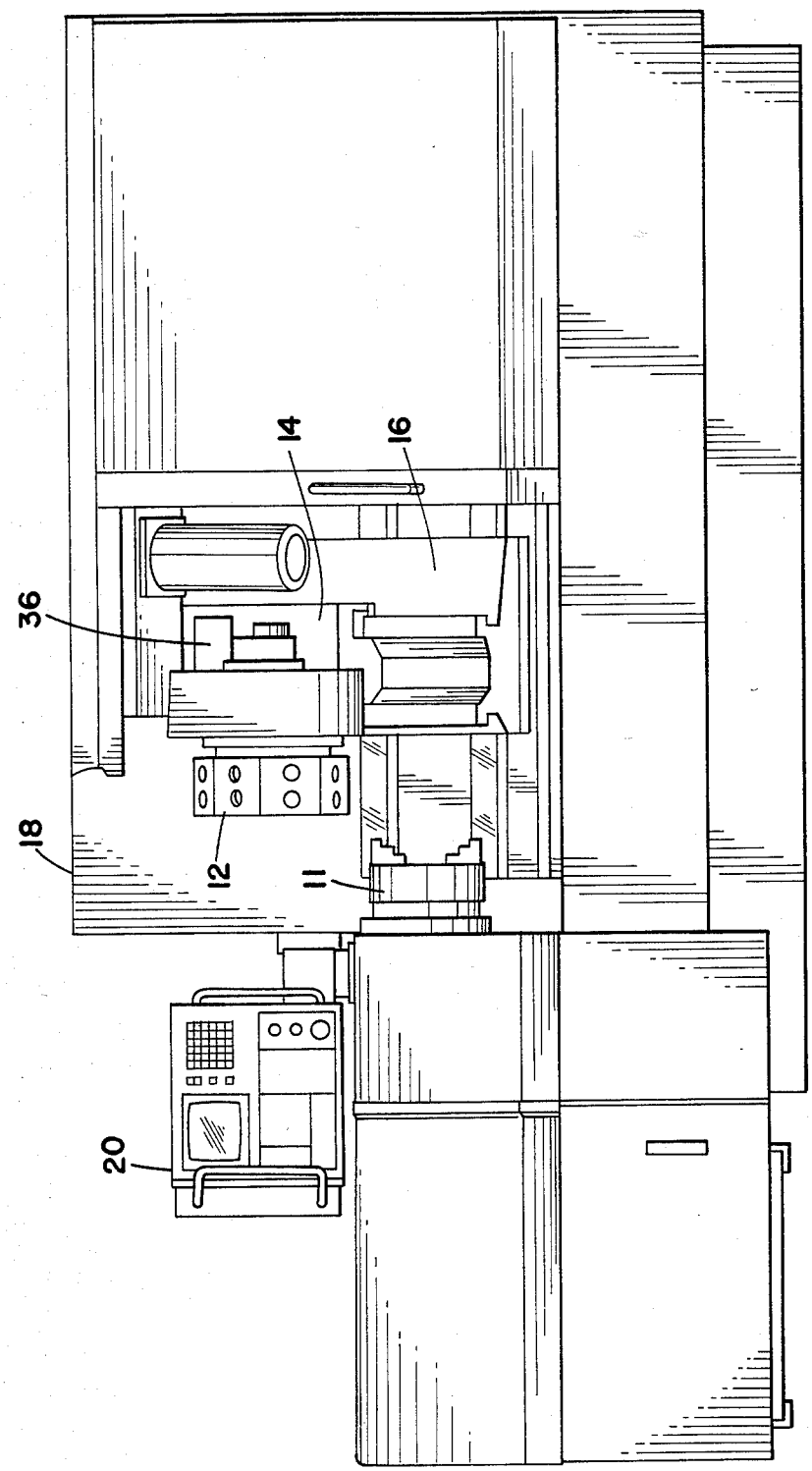
FIG. 9 is a view of a turning machine utilizing the disclosed turret indexing.

Referring now to the drawings and FIG. 9 in particular there is shown a turning machine 10 utilizing the present invention. Turning machine 10 includes a driven head stock 11 which grips and rotates a workpiece to be machined. A tail stock is provided for engaging one end of a relatively long work piece to provide support during machining. A tool turret 12 which is supported for two axes movement, by a cross slide 14 and a carriage 16, brings selected tools into position with respect to the workpiece for machining. An NC controller 18 having an input control panel 20 is provided for controlling operation of machine tool 10. Suitable controllers which are commercially available are supplied by Bendix, General Electric, Allen Bradley or Fanuc. Servo drive motors are provided for positioning carriages 16 and cross slide 14 for two axes positioning of tools which are supported by turret 12. Turret 12 has eight work station positions and is indexible to bring a selected tool into position for machining the workpiece. A machine tool 10 on which the present invention can be utilized is described in more detail in U.S.

patent application Ser. No. 199,019 whose teachings are herein incorporated by reference.

Figure 3:
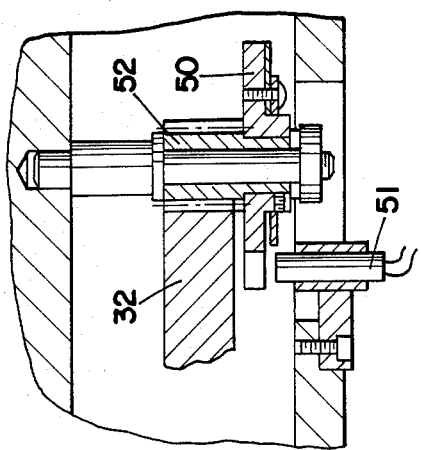
FIG. 3 is a section view taken in FIG. 2 along the line III—III.
Figures 2A, 2B:
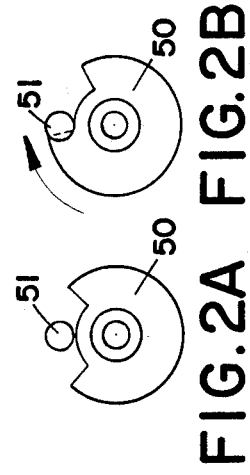
FIGS. 2A through 2E schematically show the final position cam at various points when indexing the tool turret.
Figures 2C, 2D:
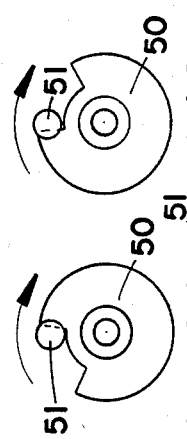
Figure 2E:
Figure 2:
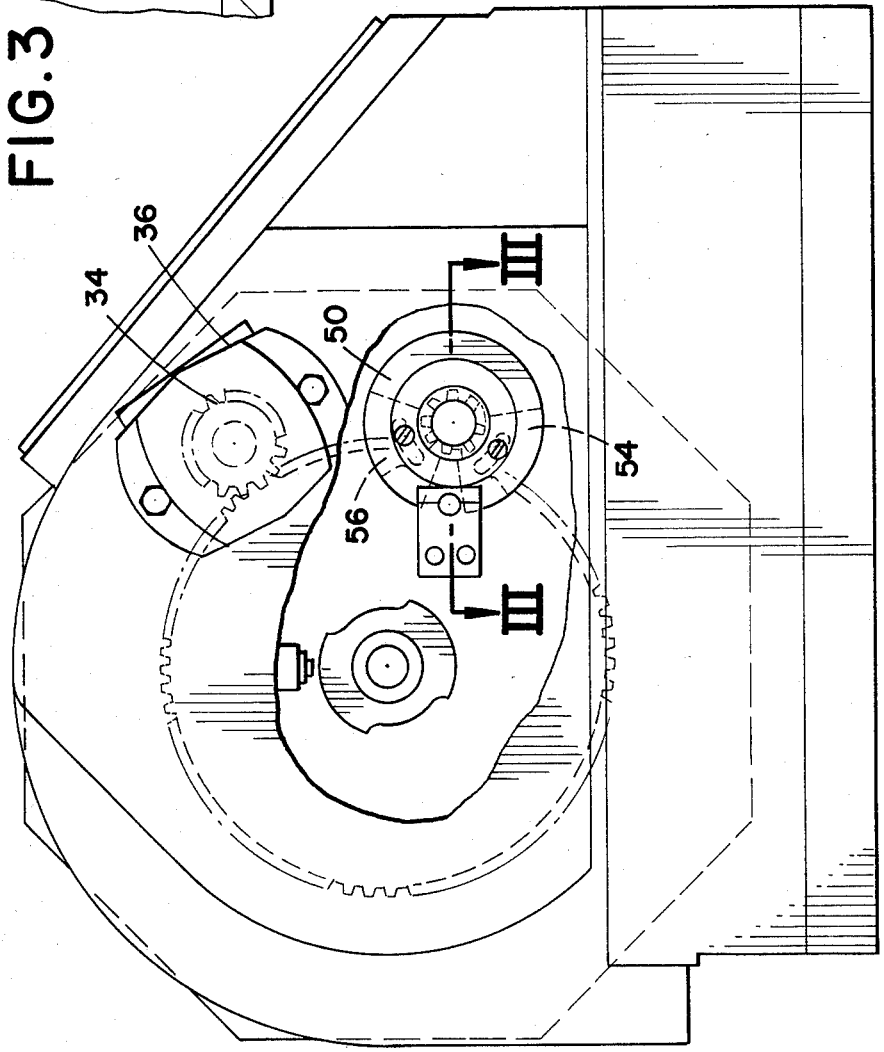
FIG. 2 is an end view, with portions deleted and broken away for clarity, showing the final position cam.

Refering now to FIGS. 1 through 3, there is shown in more detail the mechanism which is utilized for indexing tool turret 12. A turret bar 22 is secured to turret 12. Turret bar 22 is movable back and forth along its longitudinal axis. A curvic coupling 24 is secured between turret 12 and cross slide 14. One portion of curvic coupling 24 is secured to turret 12 and the other portion of the curvic coupling 24 is secured to cross slide 14. When turret bar 22, as shown in FIG. 1, is moved to the left curvic coupling 24 is disengaged and turret 12 can be rotatably indexed.

A piston arrangement 26 is secured to turret bar 22. A pair of hydraulic passages 28 and 30 are provided for conducting pressurized hydraulic fluid to move piston 26 turret bar 22 and turret 12. When pressurized hydraulic fluid is introduced through passage 30 turret bar 22 moves outward to disengage curvic coupling 24. When pressurized hydraulic fluid is introduced through passage 28 turret bar 22 is moved to the right engaging curvic coupling 24 and holding turret bar 12 in a selected index position. When pressurized hydraulic fluid is introduced through passage 28 or 30 hydraulic fluid is conducted away by the other passage 28 or 30. An indexing gear 32 is secured to turret bar 22. Indexing gear 32 can be driven by a gear 34 which is rotated by a suitable indexing drive motor 36. When curvic coupling 24 is dissengaged index drive motor 36 can rotate turret 12 in either direction to one of its eight selected work stations. Indexing drive motor 36 is preferably a hydraulic motor.

An open loop control system is used to locate the turret 12 in position before clamping. The command signals for clamping or unclamping turret 12 and rotating indexing motor 36 are provided by numerical controller 18. Appropriate command signals are generated in response to information stored in memory and signals from six cams which trigger six proximity switches. Five of the cams are concentric with and attached to the rear end of turret bar 22.

Cams 40 and 42 and their associated proximity switches 41 and 43 are used to detect if turret 12 is out, at an unclamped position, or in, with curvic coupling 24 engaged. In the disclosed machine curvic coupling 24 has sixteen teeth and turret 12 has eight work stations. Thus it is possible for curvic coupling 24 to be engaged when turret 12 is indexed between work stations. As an added safety feature to prevent machine operation if turret bar 22 is improperly retracted to engage curvic coupling 24 between work stations, cam 40 is sectionalized as shown in FIG. 1A. If turret bar 22 is retracted to engage curvic coupling 24 with turret 12 between work stations an open portion of cam 40 will be aligned with its associated proximity switch 41. Proximity switch 41 will thus not detect cam 40 and this will prevent operation of machine tool 10 if curvic coupling 24 is ever engaged when turret 12 is not at one of its eight work stations. Proximity switch 43 detects cam surface 42 when turret bar 22 moves out to an extended unclamped position.

Cams 44, 46 and 48 are shown in FIGS. 1B, 1C and 1D with relative locations of the eight work stations being indicated. Cams 44, 46 and 48 in conjunction with proximity switches 45,47 and 49 tell controller 18 which of the eight turret work stations is approaching when turret 12 is indexed. Each of the three proximity switches, 45, 47 and 49 have an on or off position. With a zero indicating off and a one indicating on the output of the proximity switches associated with the three cams at the eight work station positions is shown in FIG. 5. Thus it can be seen that three cams non-ambiguously detect all eight work stations. Also, as the turret travels between any two stations there is only one signal transition. That is, position representation provided by the three proximity switches 45,47 and 49 are a Gray code output and only one proximity switch is activated or deactivated for each work station which is approached. Since there is only one signal transition for each work station which is approached the control 18 can be certain as to which work station the turret is approaching. This provides diagnostic information which can be used with a final position proximity switch to constantly insure that the proximity switches are functioning properly. An appropriate controller fault routine can be executed if an error is detected. Cams 44,46 and 48 are wide enough so that their associated proximity sensors 45, 47 and 49 can sense the cam surfaces when turret bar 22 is either extended or retracted.

A final position cam 50 as shown in FIGS. 2 and 3 is provided for final positioning of turret 12 at a selected work station. Final positioning cam 50 is connected to be rotated by gear 52 which engages turret positioning gear 32. Turret positioning gear 32 is selected to rotate final positioning cam 50 at a multiple of the rate at which turret 12 is rotated during indexing. In the embodiment shown, indexing gear 32 has ninety six teeth and final positioning cam gear 52 has twelve teeth so that the final positioning cam is rotated eight times for one complete revolution of turret 12. A proximity switch 51 is associated with cam 50 for detecting the open portion of the cam 50.

The open portion of cam 50 is defined by two slidable members 54 and 56. Slots are provided for relative positioning of slidable members 54 and 56 to adjust the open portion of cam 50. For a particular machine it may be desirable to change the open portion of cam 50 to obtain more accurate final positioning of tool turret 12.

Figure 4:
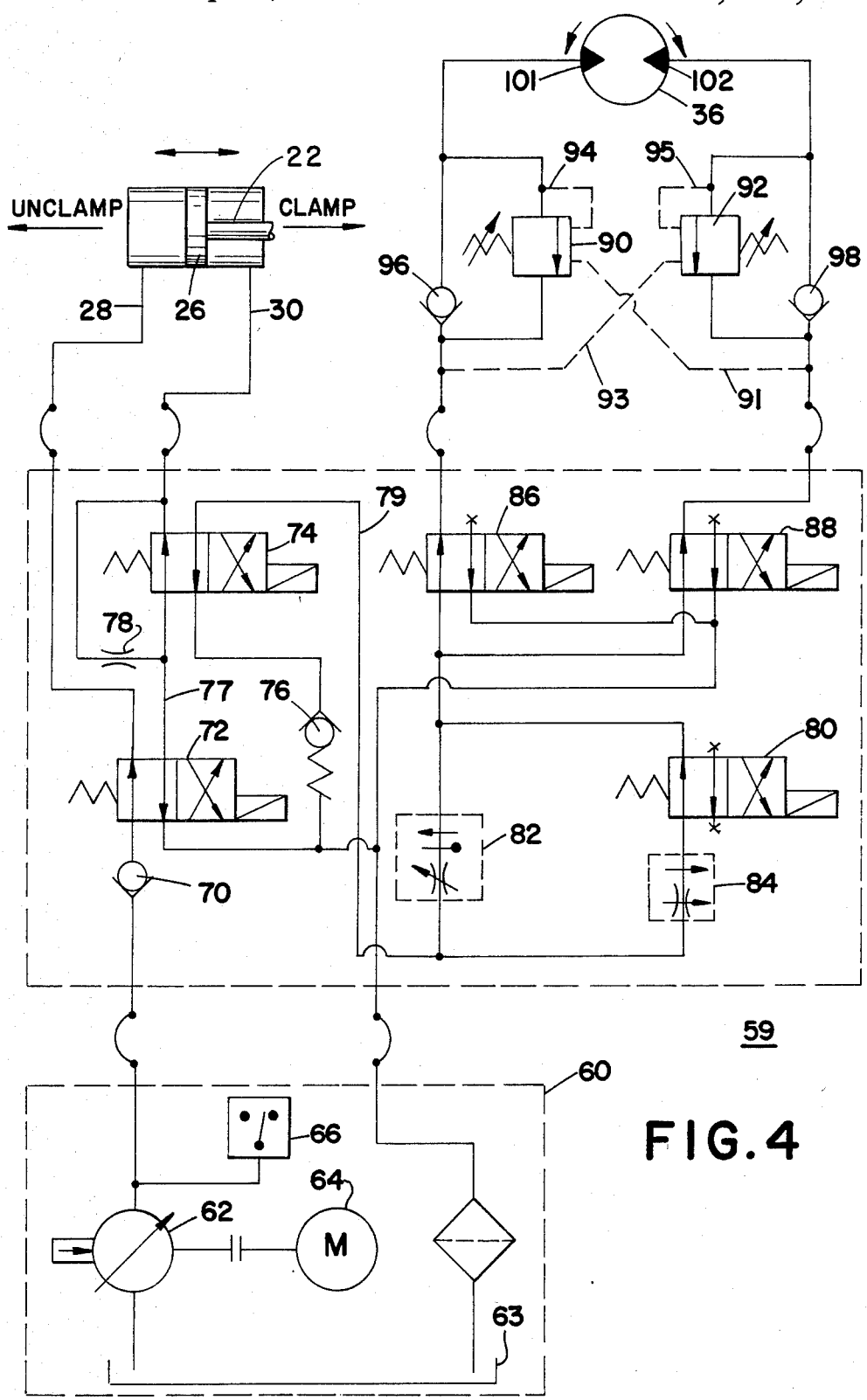
FIG. 4 is a hydraulic schematic of the two speed indexing and clamp circuit.

Refering now to FIG. 4 there is shown the hydraulic circuit 59 for indexing turret 12. A hydraulic power supply 60 provides pressurized hydraulic fluid for clamping and unclamping the turret bar and for indexing the turret to a selected work station. Hydraulic power supply 60 consists of a pump 62 which is driven by an appropriate drive motor 64. A pressure switch 66 is provided for sensing the pressure of hydraulic fluid supplied by pump 62. Pressurized hydraulic fluid at 850 psi is supplied through a safety check valve 70. Safety check valve 70 is utilized to hold the turret clamped in case of a power failure. A four way two position spring bias solenoid valve 72 is provided for moving the turret bar 22 between an out or unclamped position and an in or clamped position.

A four way two position spring bias solenoid valve 74 is provided for causing a lower pressure to hold piston 26 in the unclamped position and to direct pressurized hydraulic fluid for indexing of turret 12. The lower pressure for holding piston 26 in an unclamped position is desirable for reducing friction when indexing. With solenoid valves 72 and 74 in the position shown in FIG. 4 turret bar 22 is moved to a clamped position. Pressurized hydraulic fluid is supplied to the left side of piston 26, thru passage 28, and the fluid on the right side of piston 26 is vented through passage 30 and valves 72 and 74 to tank 63 in power supply 60.

A spring biased regulating check valve 76 is provided for regulating the pressure which holds turret bar 22 in the unclamped position. A relatively small orifice 78 is provided for restricting flow to unclamp turret bar 22. With solenoid valve 72 energized and solenoid valve 74 deenergized pressurized hydraulic fluid is fed through valve 72 to line 77 and through restricting orifice 78 and valve 74 to move piston 26 and turret bar 22 to an unclamped position. When valve 74 is energized passage 30 is in direct communication with regulating check valve 76, which limits the pressure applied to hold piston 26 in an unclamped position to approximately 75 psi. With valves 72 and 74 energized piston 26 is held in an unclamped position and hydraulic fluid is supplied through valves 72 and 74 to line 79. Line 79 feeds pressurized hydraulic fluid used for driving hydraulic motor 36 to index turret 12.

A low speed solenoid valve 80 is provided for causing hydraulic motor 36 to be positioned at a low speed. Variable flow devices 82 and 84 provide paths for pressurized hydraulic fluid which is used to drive motor 36. When solenoid valve 80 is energized flow is restricted to a path only through orifice 82 and hydraulic motor 36 is driven at a low speed.

A forward indexing valve 86 and a reverse indexing valve 88 are provided for causing hydraulic motor 36 to rotate in either direction.

Valves 86 and 88 are energized to stop pressurized hydraulic fluid from feeding to motor 36. When either of these valves 86,88 are deenergized, pressurized hydraulic fluid will be fed to drive motor 36. A pair of pilot operated valves 90 and 92 are connected in the hydraulic circuit feeding motor 36. Pilot operated valves 90 and 92 each have two pilot inputs. Valve 92 has one pilot input 93 which is a cross-over from one line which is connected to feed motor 36. Likewise valve 90 has a pilot input 91 which is a cross-over from the other line connected to feed hydraulic motor 36. Valve 90 also has a pilot line 94 which communicates with the hydraulic connection to a port 101 on a motor 36 and causes valve 90 to function as a safety relief. Valve 92 also has a pilot line connection 95 which communicates with the hydraulic connection to a port 102 on motor 36. For the particular valves selected a pressure of 1300 psi on lines 94 or 95 cause the associated valve 90, 92 to open. A lower pressure of approximately 433 psi is required on the cross-over pilot lines 91, 93 for opening the associated relief valve 90, 92. Combinations of pressure from the two pilot inputs to relief valves 90, 92 can also cause these valves to open.

The turret indexing system includes the two flow control devices 82 and 84 for providing two speed operation, two direction control valves 86 and 88 for forward and reverse rotation, and the two counterbalance valves 90 and 92 to minimize drift on stopping and to eliminate over center turret runaway of hydraulic motor 36. The disclosed open loop hydraulic system relies on the repeatability of the hydraulic and electrical components utilized to guarantee the positional accuracy needed. Curvic coupling 24 properly engages if turret 12 is brought to a stop within approximately plus or minus two degrees of the work station selected. With the adjustable final position cam 50 the position where the associated proximity switch 51 is tripped can be varied, in either direction, to obtain the necessary accurate positioning.

A typical operating sequence will now be described. With turret 12 clamped at a work station the turret unclamped valve 72, turret relief valve 74, and the low speed solenoid valve 80 are all deenergized. The forward direction solenoid valve 86 and the reverse direction solenoid valve 88 are both energized. Thus, both lines which feed from valves 86, 88 to the hydraulic motor 36 are connected to tank. However, the lines directly connected to the motor ports 101, 102 are blocked because counterbalance valves 90 and 92 are closed and check valves 96 and 98 prevent hydraulic flow around valves 90 and 92. Thus both motor ports 101, 102 are locked from venting hydraulic fluid. When indexing the tool turret 12 to another selected work station first the turret unclamped solenoid valve 72 is energized. Energizing valve 72 directs high pressure oil thru line 77 to the unclamp side of turret piston 26 and moves turret bar 22 outward to disengage curvic coupling 24. Just before piston 26 bottoms in the unclamped position the unclamped face cam 42 trips its associated proximity switch 43. Tripping of proximity switch 43 generates a signal which causes the turret relief solenoid valve 74 to energize. Energizing turret relief solenoid valve 74 causes the turret to be held in an unclamped position by hydraulic fluid at approximately 75 psi which is set by a regulating check valve 76. This holding pressure can be contrasted with the normal system operating pressure which is 850 psi. Holding piston 26 in the unclamped position with 850 psi would create excessive drag on hydraulic motor 36 as it indexes turret 12. When turret relief valve 74 is energized fully system pressure is then available on line 79 for indexing the turret in either direction.

To rotate hydraulic motor 36 in either direction the forward or reverse direction solenoid 86 or 88 is deenergized. Deenergizing one of the direction control valves 86,88 allows pressurized oil to be supplied to one port 101, 102 of motor 36. This pressurized hydraulic fluid through one of the cross-over pilot lines 91,93 opens the counterbalance valve 90, 92 on the opposite line and connects the opposite motor port 101, 102 to tank 63. This sequence causes the hydraulic motor 36 to rotate in the selected direction. As motor 36 initially starts to rotate it will rotate at the high speed since the low speed solenoid valve 80 is deenergized allowing pressurized hydraulid fluid to flow through both flow control devices 82,84.

Low speed rotation of hydraulic motor 36 is obtained by energizing solenoid valve 80 and thus restricting fluid flow to a path through flow control device 82. Final positioning of tool turret 12 is obtained by driving hydraulic motor 36 at its low speed. The signals for controlling two speed operation and stopping action of tool turret 12 are obtained from electrical control circuit 17, including controller 18, which uses information from the various cams 40, 42, 44, 46, 48, 50 and their associated proximity switches 41,43,45,47,49,51. The final positioning cam 50 rotates once for each work station, that is for every ⅛th revolution of the turret 12. Final positioning cam 50 is used for final fine positioning of turret 12 before stopping and clamping.

FIGS. 2A through 2E illustrate the sequence for final positioning cam 50 as turret 12 is indexed from station one to station three. Controller 18 selects the direction of indexing which will minimize turret travel. Initially, final positioning cam 50 is in a position as shown in FIG. 2A. When the turret indexes from station one to station three the final positioning cam 50 causes proximity switch 51 to go through two transitions which controller 18 monitors without control output. The first transition is shown in FIG. 2B. As the tool turret 12 is leaving station one and moving toward station two, proximity switch 51 is activated at this point. As turret 12 continues to index and station two is approached from station one, proximity switch 51 relative to cam 50, is in a position as shown in FIG. 2C and is deactivated. Tool turret 12 continues to rotate at a high speed through the work station two position. As the final position cam 50 rotates past station two toward the selected station three proximity switch 51 is again triggered as shown in FIG. 2D. Controller 18 programmed to sense that the selected work station three is now being approached. When the controller 18 senses that the selected work station is being approached a timer in controller 18 is started.

FIG. 8 illustrates graphically final positioning of tool turret 12. When the programmed time period expires the controller energizes low speed solenoid 80 shutting off fluid flow through device 84. There is a brief stabilization time as shown in FIG. 8 when the timer expires. Tool turret 12 continues to index toward the work station three position at a low speed. As final position cam 50 continues to rotate toward the clamping position for work station three proximity switch 51 is again deactivated as shown in FIG. 2E. At the time point 101 shown in FIG. 2E proximity switch 51 signals the electrical system 17 which causes forward solenoid valve 86 to reenergize. Reenergizing forward solenoid valve 86 connects this portion of the forward operating line to tank and both pilot operated valves 90 and 92 are in a closed position locking the motor 36 and the tool turret 12 in final position at work station three. Proximity switch 51, relative to final position cam 50 is now at a position as shown in FIG. 2A, within a plus or minus sixteen degree tolerance, and turret bar 22 can be clamped engaging curvic coupling 24.

Since indexing speed is closely regulated and the reaction time of the external circuit control components are repeatable turret 12 can be properly stopped at the desired position. The final positioning cam 50 has adjustable portions 54 and 56 for varying the point at which the associated proximity switch 51 is triggered. For the curvic coupling 24 to be properly engaged the tool turret should be within plus or minus two degrees of the desired position. Since final positioning cam 51 rotates at an 8 to 1 ratio with respect to turret 12 final positioning cam 50 need only be within plus or minus sixteen degrees of its desired position to assure that the turret is properly located for clamping.

When turret 12 is located at its final position the turret relief valve 74, turret unclamped valve 72 and the low speed solenoid valve 80 are all deenergized. These valves are now in the deenergized state and ready for the next indexing operation. Deenergizing valves 72 and 74 causes the turret to move to a clamped position and be held in the clamped position at high pressure with the curvic coupling 24 engaged.

Two single acting solenoid directional control valves 86 and 88 are used for turret forward or reverse rotation. These valves could be replaced by a double solenoid spring centered valve. To operate the system either solenoid would be deenergized to stop. However, a potential problem with this construction is that the speed to center the spool after a solenoid is deenergized will vary considerably with the temperature of the system oil. This variance due to the temperature of the hydraulic fluid, however, is much less when a solenoid is energized. To minimize the stopping variances the two solenoid valves 86 and 88 with the energized to stop feature are used.

The counterbalance valves 90 and 92 can be purchased from Sun Hydraulics. These pilot operated valves act as crossover check valves, over center counter balance valves and safety relief valves.

FIG. 6 shows the operation of the counter balance valves 90, 92 and direction control valves 86, 88. As indicated above, valve 86 and 88 are energized to stop and deenergized to rotate motor 36. As shown in FIG. 6, for forward rotation valve 86 is deenergized and valve 88 remains energized. Pressurized fluid is then connected through check valve 98 to port 101 of motor 36. Pressurized fluid also acts through crossover pilot line 93 to move valve 92 to an open position to connect port 102 through valve 92 and valve 88 to tank 63. Pilot valve 90 and 92 can also operate as pure pressure relief valves in response to pilot signals along lines 94 and 95. A pressure of 1300 psi is required on pilot lines 94 or 95 to operate pilot valves 90 or 92. Normally the pressure relief function will only occur if the turret comes to a stop and it is not perfectly on center within the plus or minus two degree allowable band for the curvic coupling. As turret 12 is pulled in the mating of the teeth on curvic coupling 24 will cause motor 36 to rotate slightly and with both counterbalance valves 90 and 92 closed this will cause a pressure buildup on one side. If the pressure build up in the lines connected to ports 101 or 102 exceed 1300 psi the appropriate valve 90, 92 will open to vent the oil to tank 63. The relief function may also be beneficial in preventing breaking of a hydraulic line should some system malfunction occur.

Valves 90, 92 can also operate to keep the speed of motor 36 relatively constant should an over center load condition occur. If an over center load condition, as shown in FIG. 7, occurs motor 36 may start to run away. However, this runaway will cause port 101 to attempt to suck hydraulic fluid from the pressure side and thus cause the pressure to fall. Falling of pressure at port 101 will reduce the pressure in pilot line 93 causing valve 92 to throttle and keep motor 36 rotating at a relatively constant speed.

Figure 10:
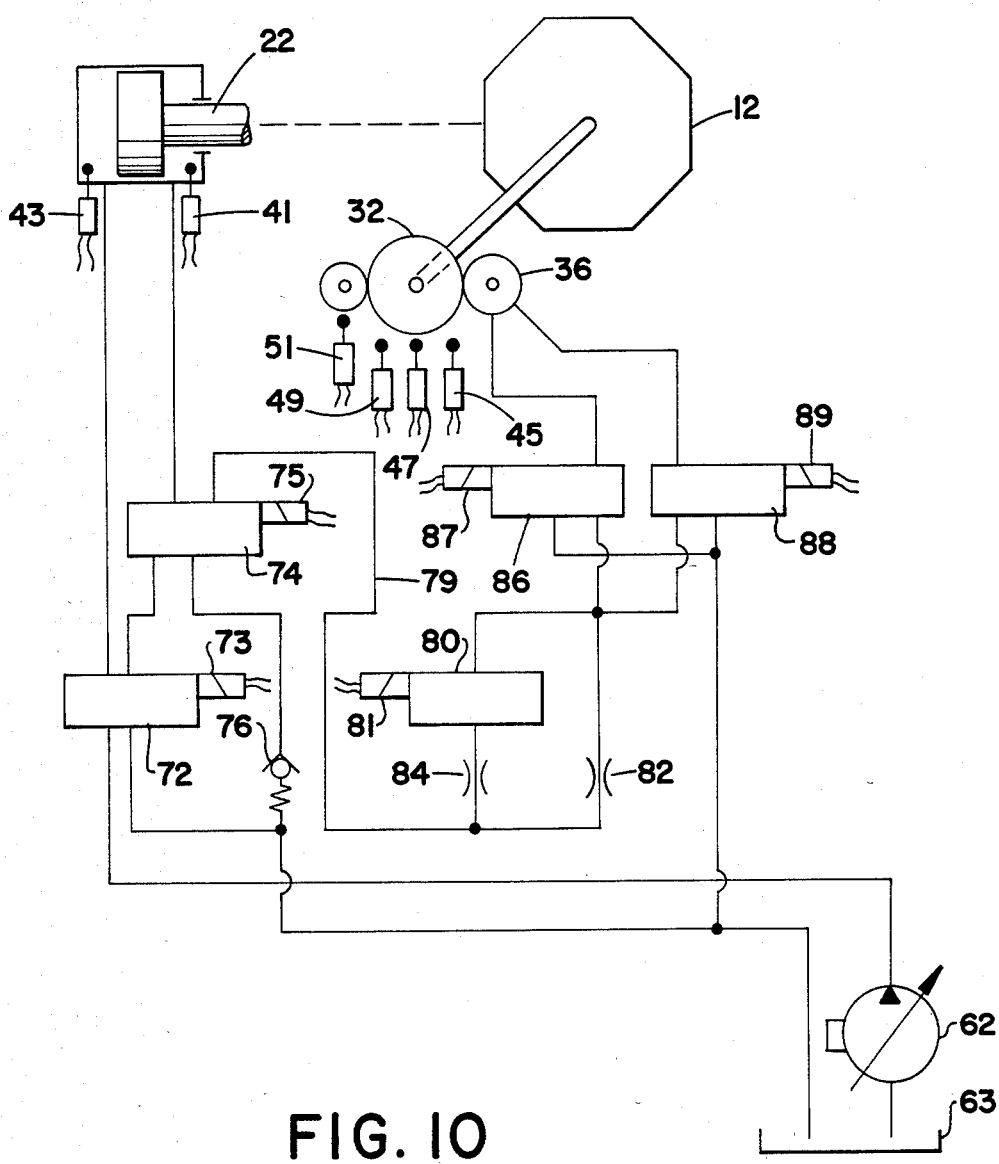
FIG. 10 is a simplified schematic showing the electrical and mechanical interface for the turret indexing system; and, FIG. 11 shows the electrical control circuit for the indexing system.
Figure 11:
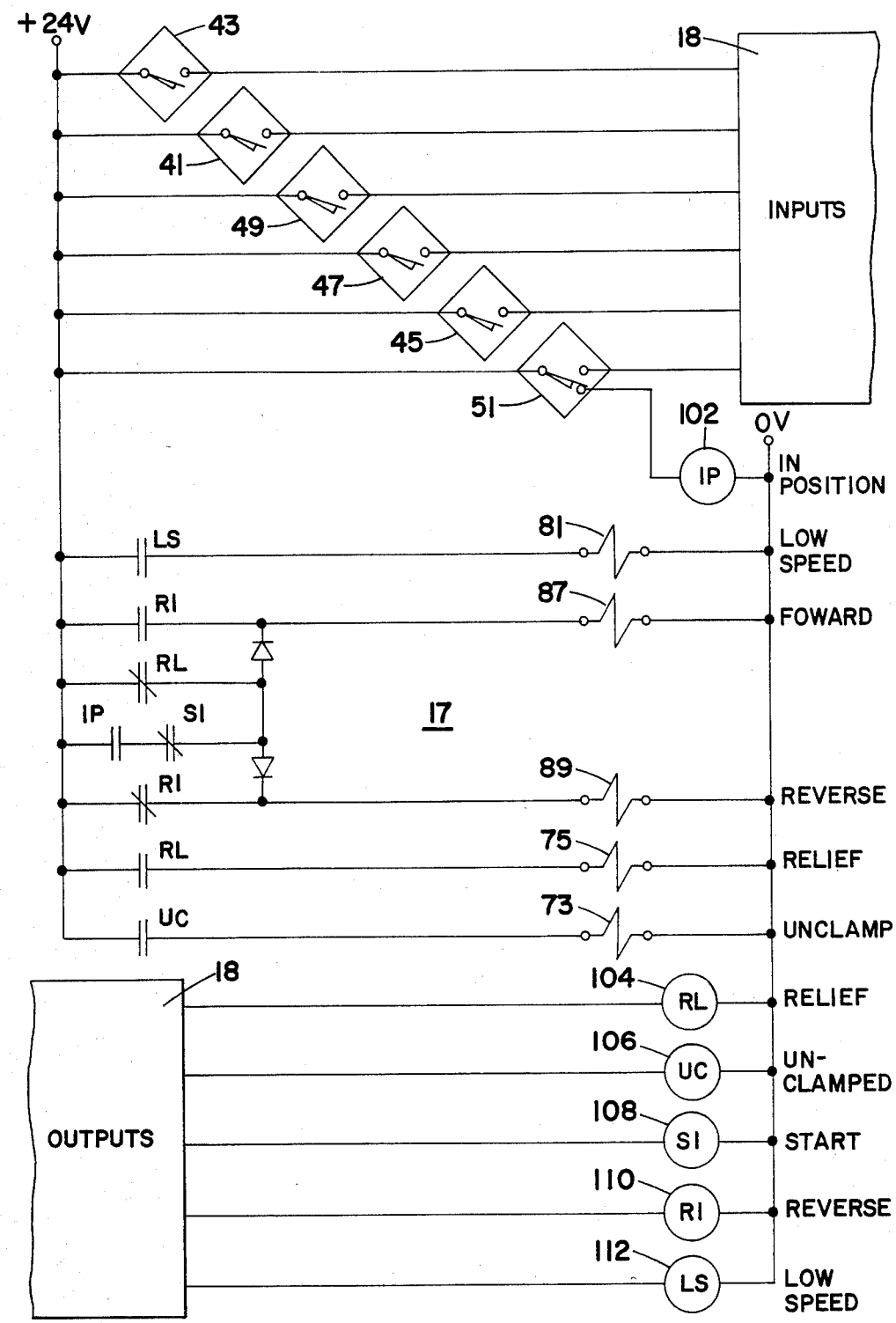

Refer now to FIG. 10, there is shown a simplified drawing of the electrical and mechanical interface for indexing of turret 12. Proximity limits switches 45, 47 and 49 monitor movement of the cams 44, 46 and 48 which rotate with turret 12. Proximity limit switch 51 monitors the final position cam 50 which is gear driven to rotate eight times faster than turret 12. Proximity limit switch 43 detects when turret 12 is unclamped and proximity switch 41 detects when turret 12 is clamped. Solenoid valves 72, 74, 80, 86 and 88 are operated in response to the electrical control circuit 18 showing in FIG. 11.

The electrical control circuit 17 for indexing includes an NC controller 18 which utilizes six digital input and provides five digital outputs. A twenty-four volt DC power supply is used for control circuit 17. Six proximity switches 41, 43, 45, 47, 49 and 51 monitor the status of their six associated cams as described above. Outputs from these proximity switchings are fed as inputs to controller 18. The final position proximity switch 51 also controls in position relay 102. Five digital outputs of controller 18 directly control relief relay 104, unclamping relay 106, start index relay 108, reverse index relay 110 and low speed index relay 112. Contacts on the unclamped relay 106, low speed relay 112 and the relief relay 104 directly control the unclamped solenoid 73, low speed solenoid 81 and the relief solenoid 75 respectively. The forward solenoid 87 and the reverse solenoid 89 are controlled by contacts from in position relay 102, relief relay 104, start indexing relay 108, and the reverse indexing relay 110.

During operation of machine tool 10 controller 18 constantly monitors inputs for possible faults. When turret 12 is to be indexed controller 18 determines the direction of indexing. Controller 18 then energizes the unclamped relay 106 which in turn energizes unclamped solenoid 73. Controller 18 monitors the clamped proximity switch 41 and the unclamped proximity swith 43 and when the turret 12 is in an unclamped position controller 18 energizes relief relay 104 which in turn energizes relief solenoid 75. Start index relay 108 and also the reverse index relay 110, if reverse has been selected as the index direction, are then energized. This then causes either the forward solenoid 87 or the reverse solenoid 89 to be deenergized and starts the turret 12 rotating at high speed in the desired indexing direction. Controller 18 continues monitoring the inputs and determines when the turret 12 is approaching the desired index position. Controller 18 then deenergizes start index relay 108 and initiates a time delay. At the end of the time delay low speed relay 112 and its associated low speed solenoid 81 are energized. Turret 12 continues to rotate at low speed to the desired indexed position. When the edge of the final position cam 50 is detected, proximity switch 51 picks up turning off relay 102. This causes the directional solenoid 87 or 89 which has been turned off to energize. Energizing the directional solenoid 87, 89 causes its associated directional valve 86, 88 to close and hold turret 12 in position for clamping. When controller 18 detects that the in position proximity switch 51 indicates that turret 12 is in position for clamping the controller 18 turns off relays 104, 106, 108, 110 and 112. This deenergizes all solenoids except forward direction solenoid 87 and the reverse direction solenoid 89, which remain energized. Turret 12 is then clamped in position and a clamped proximity switch 43 indicates when clamping is complete. Turret 12 is now indexed to the desired station and machining operation by machine tool 10 can continue.

It can thus be seen that the disclosed open loop indexing system which uses the hydraulic components for clamping and two speed turret rotation is substantially different from prior art closed loop systems. The energize to stop feature provide good position stopping repeatability. While the invention has been described for an eight station tool turret it should be understood that it can be utilized with turrets having more or less work stations.

We claim:

1. A turning machine, comprising:
   (a) a numerical control for controlling operation of the machine;
   (b) a turret which is indexible about the center axis thereof to various work stations for bringing tools, supported on the turret, into position for machining a workpiece that is mounted on the machine;
   (c) an elongated turret bar secured to the turret for unitary axial and rotational movement therewith, the bar extending from the turret and having a longitudinal axis which coincides with the center axis of the turret;
   (d) means associated with the turret for shifting the turret and attached bar axially between an unclamped position, where the turret can be indexed by rotating it about the center axis, and a clamped position, where the turret is held against rotation and indexing, the means including:
      (I) a first cam and a second cam secured to the bar in spaced relation from the turret for unitary axial and rotational movement therewith, the cams being spaced longitudinally apart on the bar a distance which is correlated to the axial distance which the bar and turret shift between the clamped and unclamped positions;
      (II) a first sensor and a second sensor fixedly disposed adjacent the cams in spaced relation along the longitudinal axis of the bar, such that the first sensor senses the first cam when the turret is in the clamped position and the second sensor senses the second cam when the turret is in the unclamped position, the sensors designed to sense the cams and, accordingly, send signals to the control.
   (e) means coacting with the bar for rotating the turret from one work station to another, when the turret is in the unclamped position, the turret rotating means including:
      (III) means operatively connected to the bar for rotating the turret from a work station at a predetermined speed;
      (IV) means operatively coupled to the bar for slowing down rotation of the turret to a slower speed when the turret reaches a predetermined distance from the work station to which the turret is being rotated;
      (V) a plurality of indexing cams secured to the bar, adjacent the first and second cams, for unitary axial and rotational movement with the bar and turret, the indexing cams being shaped in correlated relation to the rotary positions of the turret in relation to the work stations to which the turret is indexed;
      (VI) a separate indexing sensor associated with each of the indexing cams and fixed disposed adjacent thereto to sense the rotary positions of the indexing cams, the size of the indexing cams and associated sensors being correlated, such that the indexing sensors will be in sensing relationship with the indexing cams when the turret is in the clamped and unclamped positions and is moving therebetween;
      (VII) a final positioning cam operatively connected to the bar and rotatable therewith at a predetermined multiple of the speed at which the bar and turret rotate;
      (VIII) means associated with the final positioning cam for sensing a feature of the final positioning cam and sending a corresponding signal to the control to halt indexing of the turret in a position suitable for clamping; and
   (f) means coacting with the bar for clamping the turret against rotation and indexing when the turret is in the clamped position.

2. The turning machine of claim 1, wherein the first cam includes a cam having a number of arcuate caming surfaces which are equally spaced from and around, the longitudinal axis of the bar, the caming surfaces being separated by openings in the cam, the number of caming surfaces corresponding to the number of work stations to insure clamping of the turret at a work station.

3. The turning machine of claim 1, wherein the means for shifting the turret between the clamped and unclamped positions, includes:
  (g) an annular piston secured to the bar in surrounding relation intermediate to the turret and first and second cams, the piston being reciprocable in a correspondingly shaped annular bore which surrounds the bar, the piston separating the annular bore into a first bore and a second bore;
  (h) a hydraulic system for operating the piston, including a first, four way two position, spring-biased, solenoid operated valve which, when deenergized, (i) directs hydraulic fluid, under pressure, from a source to the first bore to correspondingly move the piston and shift the turret, not in the clamped position, to the clamped position, and (ii) allows hydraulic fluid to flow from the second bore back to the source, and the valve, when energized, (iii) directs hydraulic fluid, under pressure, from the source to the second bore to correspondingly move the piston and shift the turret, not in the unclamped position, to the unclamped position, and (iiii) allows hydraulic fluid to flow from the first bore back to the source; and
  (i) a first check valve between the source and first valve to prevent the backflow of hydraulic fluid, under pressure, from the first valve to the source.

4. The turning machine of claim 3, wherein the means (III) for rotating the turret from a work station at a predetermined speed includes:
  (j) a hydraulically operated motor operatively connected to the bar for rotating the turret, the motor having (i) a first port through which hydraulic fluid is directed to operate the motor to rotate the turret in one direction, and (ii) a second port through which hydraulic fluid is directed to operate the motor to rotate the turret in an opposite direction;
  (k) a second, four way two position, spring-biased solenoid operated valve between the first valve and second bore, the second valve, when deenergized, allowing hydraulic fluid to flow to and from the second bore depending on whether the first valve is energized or deenergized, and the second valve, when energized after the second sensor senses the second cam, diverting hydraulic fluid, flowing from the first valve to the second bore, to the motor for operation thereof;
  (l) means cooperating with the second valve to restrict the flow of hydraulic fluid from the second bore to the source, when the second valve is energized, to reduce the fluid pressure in the second bore to a lower level which is sufficient to hold the turret in an unclamped position while allowing easier rotation of the turret; and
  (m) means between the second valve and motor for alternately directing hydraulic fluid, under pressure, to the first and second ports of the motor in response to the control.

5. The turning machine of claim 4, wherein the means (m) for alternately directing hydraulic fluid to the first and second ports of the motor; includes:
  (n) a third, four way two position, spring-biased, solenoid operated valve between the second valve and first port of the motor, the third valve, when deenergized, directing hydraulic fluid to the first port, and, when deenergized, blocking the flow of hydraulic fluid to the first port and allowing hydraulic fluid to flow from the first port to the source;
  (o) a fourth, four way two position, spring-biased, solenoid operated valve between the second valve and second port of the motor, the fourth valve, when deenergized, directing hydraulic fluid to the second port, and, when energized, blocking the flow of hydraulic fluid to flow from the second port to the source;
  (p) a second check valve between the third valve and first port for preventing the backflow of hydraulic fluid from the first port through the third valve;
  (q) a third check valve between the fourth valve and second port for preventing the backflow of hydraulic fluid from the second port through the fourth valve;
  (r) a spring-biased pilot associated with each of the check valves for allowing hydraulic fluid to bypass the check valves when the associated pilot valve are energized by, (i) a predetermined fluid pressure between the pilot valves and associated ports of the motor, or (ii) a predetermined fluid pressure in cross-over lines between, (I) the third valve and the pilot valve associated with the fourth valve, and (II) the fourth valve and the pilot valve associated with the third valve.

6. The turning maching of claim 5, wherein the means (IV) for slowing down rotation of the turret, includes:
  (s) a first, pressure and temperature compensating variable flow device through which a portion of the hydraulic fluid, directed to the third or fourth valves, passes;
  (t) a second, at least pressure compensating variable flow device through which the remaining portion of the hydraulic fluid, directed to the third or fourth valves, passes; and
  (u) a fifth, four way two position, spring-biased, solenoid operated valve associated with the second variable flow device, the fifth valve, when deenergized, allowing hydraulic fluid to flow through the second device and, when energized, blocking the flow of hydraulic fluid through the second device, so that only the portion of the hydraulic fluid from the first device is directed to the motor, the fifth valve being energized by a signal from the control in response to a signal from the indexing sensor which is designated to signal the approach of the turret to the desired work station.

7. The turning machine of claim 6, wherein the clamping means (f) includes a curvic coupler coacting with the turret for clamping the turret against rotation.

8. The turning machine of claim 7, wherein the sensed feature of the final positioning cam includes a generally pie-shaped opening in the cam, and means for varying the size of the opening.

* * * * *